(12) United States Patent
Yamashita

(10) Patent No.: US 10,391,955 B2
(45) Date of Patent: Aug. 27, 2019

(54) ELECTRICAL JUNCTION BOX

(71) Applicant: Sumitomo Wiring Systems, Ltd., Yokkaichi, Mie (JP)

(72) Inventor: Takahiro Yamashita, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/510,202

(22) PCT Filed: Sep. 7, 2015

(86) PCT No.: PCT/JP2015/075302
§ 371 (c)(1),
(2) Date: Mar. 9, 2017

(87) PCT Pub. No.: WO2016/047425
PCT Pub. Date: Mar. 31, 2016

(65) Prior Publication Data
US 2017/0305370 A1  Oct. 26, 2017

(30) Foreign Application Priority Data
Sep. 24, 2014  (JP) .................................. 2014-193490

(51) Int. Cl.
*H01R 13/502* (2006.01)
*B60R 16/023* (2006.01)
(Continued)

(52) U.S. Cl.
CPC ......... *B60R 16/0238* (2013.01); *H02G 3/083* (2013.01); *H02G 3/16* (2013.01); *B60R 16/033* (2013.01)

(58) Field of Classification Search
CPC .................................. H02G 3/16; H02G 3/083
(Continued)

(56) References Cited

U.S. PATENT DOCUMENTS 4,382,649 A * 5/1983 Meyer .................. H01R 13/518
174/60
4,623,753 A * 11/1986 Feldman .............. H01R 4/2483
174/50
(Continued)

FOREIGN PATENT DOCUMENTS

JP 2004-311614 A 11/2004
JP 2006-174657 A 6/2006
(Continued)

OTHER PUBLICATIONS

Search Report for International Application No. PCT/JP2015/075302, dated Dec. 1, 2015, 4 pp.

*Primary Examiner* — Timothy J Thompson
*Assistant Examiner* — Rhadames Alonzo Miller
(74) *Attorney, Agent, or Firm* — Honigman LLP

(57) ABSTRACT

Provided is an electrical junction box including a main body casing accommodating a circuit, an electric-wire mounting section is disposed on the outer side of the main body casing, a terminal section of an electric wire is mounted thereto. The electric-wire mounting section includes: an accommodation section that can be opened so as to accommodate the terminal section of the electric wire, wherein a connection section is electrically connected to the terminal section; an electric-wire holding cover that can be opened and closed covers the accommodation section. When closed, the electric-wire holding cover engages the electric wire yet to be connected to the connection section, keeping the electric wire from being dislodged from the accommodation section and forming an opening area for accommodating the connection of the terminal section of the electric wire to the connection section. The main cover is configured to cover the opening area.

15 Claims, 8 Drawing Sheets

(51) Int. Cl.
*H02G 3/16* (2006.01)
*H02G 3/08* (2006.01)
*B60R 16/033* (2006.01)

(58) Field of Classification Search
USPC .......................................................... 174/560
See application file for complete search history.

(56) References Cited

U.S. PATENT DOCUMENTS

| | | | | | |
|---|---|---|---|---|---|
| 4,940,419 | A | * | 7/1990 | Kurita | ................ H01R 13/5213 439/271 |
| 6,045,390 | A | * | 4/2000 | Metz | ........................ H02G 3/16 439/405 |
| 8,137,115 | B1 | * | 3/2012 | Chou | ........................ H01R 9/24 136/244 |
| 2004/0094319 | A1 | * | 5/2004 | Koessler | ................ H02G 3/081 174/50 |
| 2006/0131045 | A1 | | 6/2006 | Okada | |
| 2008/0149386 | A1 | * | 6/2008 | Kanamaru | ............... H01R 9/24 174/520 |
| 2009/0086444 | A1 | * | 4/2009 | Yoshikawa | .............. H02G 3/16 361/752 |
| 2010/0173511 | A1 | * | 7/2010 | Giefers | .................. H01R 4/489 439/329 |
| 2011/0244719 | A1 | * | 10/2011 | Xue | ....................... H01R 13/17 439/575 |
| 2013/0094124 | A1 | * | 4/2013 | Yang | ........................ H02G 3/08 361/600 |
| 2014/0174781 | A1 | * | 6/2014 | Do | ........................... H02G 3/16 174/59 |
| 2015/0171403 | A1 | | 6/2015 | Liu et al. | |
| 2015/0185430 | A1 | * | 7/2015 | Jin | ........................ G02B 6/4448 385/135 |
| 2017/0290139 | A1 | * | 10/2017 | Ooi | ........................ H05K 1/0203 |

FOREIGN PATENT DOCUMENTS

| | | |
|---|---|---|
| JP | 2008-160923 A | 7/2008 |
| JP | 2014-003739 A | 1/2014 |

* cited by examiner

ELECTRICAL JUNCTION BOX

CROSS-REFERENCE TO RELATED APPLICATIONS

This application is the U.S. national stage of PCT/JP2015/075302 filed Sep. 7, 2015, which claims priority of Japanese Patent Application No. JP 2014-193490 filed Sep. 24, 2014.

FIELD OF THE INVENTION

The present invention relates to an electrical junction box.

BACKGROUND

Conventionally, electrical junction boxes to which a terminal section of an electric wire is connected, and in which the connection portion connected to the electric wire is covered by a cover are known. JP 2006-174657A discloses an electrical junction box in which a bolted terminal of a power wire terminal is coupled by bolting to a busbar exposed along an opening of a casing of the electrical junction box, and the busbar and the bolted terminal are covered by a cover with an engagement claw of the cover engaged with a counterpart engagement section of the casing.

Meanwhile, there are cases where it is not easy to perform an operation for connecting the terminal section of the electric wire depending on a position at which the electrical junction box is installed. For example, there is a case where the electrical junction box is in an inclined orientation while being fixed to a body of a vehicle, and a position at which the terminal section of the electric wire is to be mounted is open to the lower side. In this case, if an operator does not hold the terminal section of the electric wire when positioning the terminal section of the electric wire at the mounting position, the terminal section of the electric wire slips downward from the mounting position, thus causing the problem that operability of mounting the terminal section of the electric wire degrades.

The present invention was made in view of the above-described circumstances, and it is an object thereof to provide an electrical junction box that can improve operability of mounting a terminal section of an electric wire.

SUMMARY OF THE INVENTION

According to the present invention, an electrical junction box including: a main body casing in which a circuit is accommodated; and an electric-wire mounting section to which a terminal section of an electric wire is mounted; wherein the electric-wire mounting section includes: an accommodation section that can be opened so as to allow accommodation of the terminal section of the electric wire, and in which a connection section to which the terminal section of the electric wire is electrically connected is arranged; an electric-wire holding cover that can be opened and closed, and is configured to cover the accommodation section; and a main cover that can be opened and closed, while being closed, the electric-wire holding cover engages the electric wire that has not yet been connected to the connection section, keeping the electric wire from being dislodged from the accommodation section, and forms an opening area through which an operation for connecting the terminal section of the electric wire to the connection section can be performed, and the main cover is configured to cover the opening area.

According to this configuration, in a state in which the electric-wire holding cover is engaged with the electric wire, keeping the electric wire from being dislodged from the accommodation section, an operation for mounting the terminal section of the electric wire can be performed through the opening area, and thus it is possible to improve the operability of mounting the terminal section of the electric wire.

The following configurations are preferable as embodiments of the present invention.

The main cover is provided with: an opening-area covering section for covering the opening area; and a main-cover engaged section that extends from the opening-area covering section toward the electric-wire holding cover, and is engaged with the accommodation section on the electric-wire holding cover side in a state in which the main cover is closed.

According to this configuration, the main-cover engaged section of the main cover extends toward the electric-wire holding cover, and is engaged with the accommodation section on the electric-wire holding cover side, and thus it is possible to engage the main cover in the closed state without necessarily providing a large space in which the main-cover engaged section is engaged between the main body casing and the electric-wire mounting section. Accordingly, it is possible to improve operability of mounting the terminal section of the electric wire while downsizing the electrical junction box.

The accommodation section is provided with a holding-cover engaging section that engages the electric-wire holding cover when the electric-wire holding cover is in a closed state; and a main-cover engaging section by which the main-cover engaged section is engaged, the holding-cover engaging section and the main-cover engaging section being aligned.

At least one of the electric-wire holding cover and the main cover is connected to the accommodation section via a hinge.

The main cover is configured to overlap the electric-wire holding cover.

The electrical junction box is fixed to a vehicle in an orientation such that the terminal section of the electric wire is biased in a direction in which it is dislodged from the accommodation section.

According to the present invention, it is possible to improve operability of mounting a terminal section of an electric wire.

DETAILED DESCRIPTION OF THE PREFERRED EMBODIMENTS

An embodiment will be described with reference to FIGS. 1 to 8.

An electrical junction box 10 is arranged in an electric power supply path between, for example, an electric power supply of a battery or the like of a vehicle such as an electric car or a hybrid car, and loads including in-car electric components such as lamps, and driving motors, and the like, and can be used for, for example, a DC-DC converter, an inverter, or the like. The electrical junction box 10 of the present embodiment is fixed to the vehicle in an inclined orientation (see FIG. 3), but in the following, description will be given assuming that an up-down or vertical (Z-axis) direction is based on the corresponding direction of FIG. 8, a left-right (X-axis) direction is based on the corresponding direction of FIG. 1, and with respect to a front-rear (Y-axis) direction, the "front" direction corresponds to the upward direction of FIG. 1, and the "rear" direction corresponds to the downward direction of FIG. 1.

Electrical Junction Box 10

Figure 1:
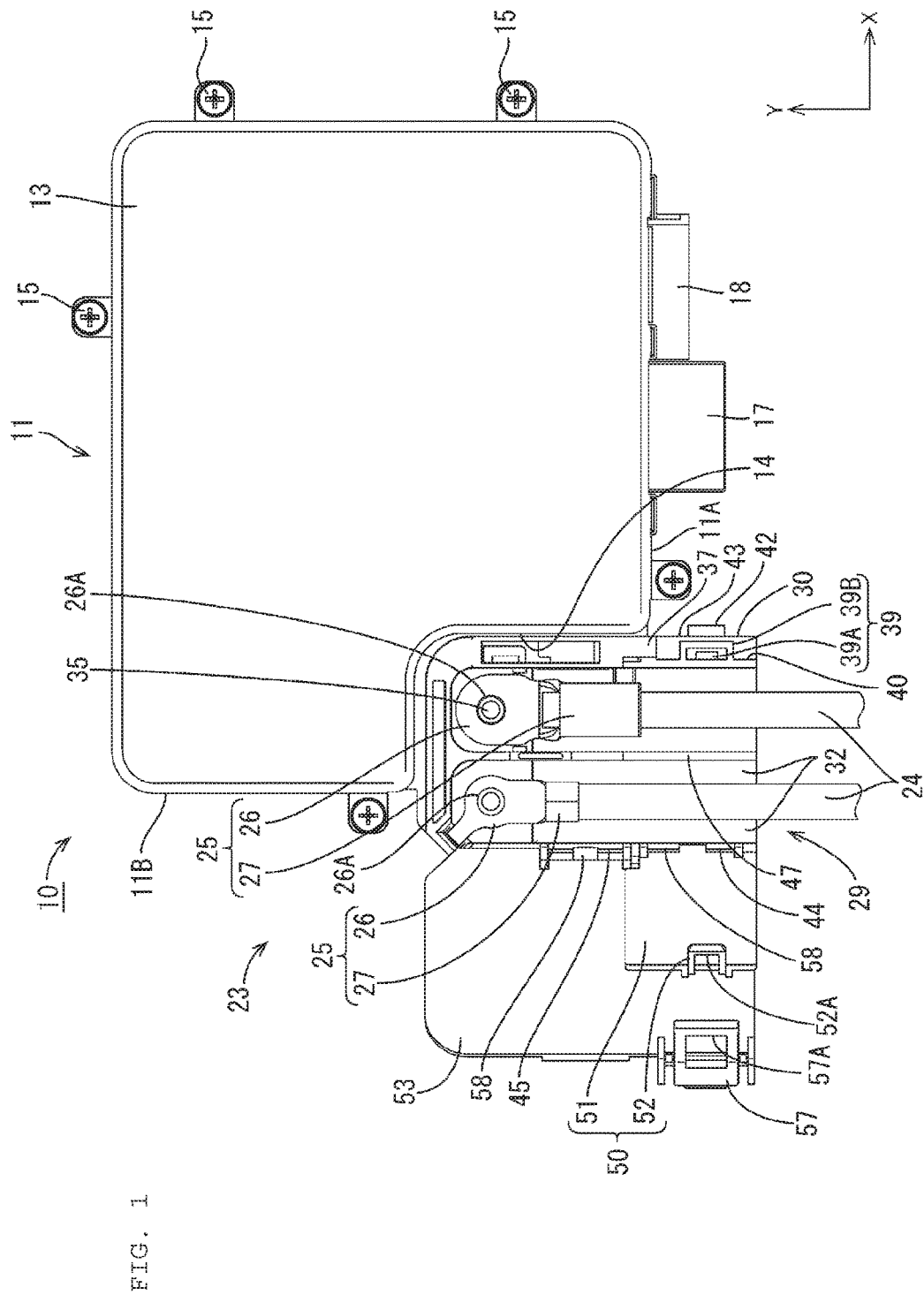
FIG. 1 is a plan view illustrating an electrical junction box according to an embodiment with multiple covers open.
Figure 3:
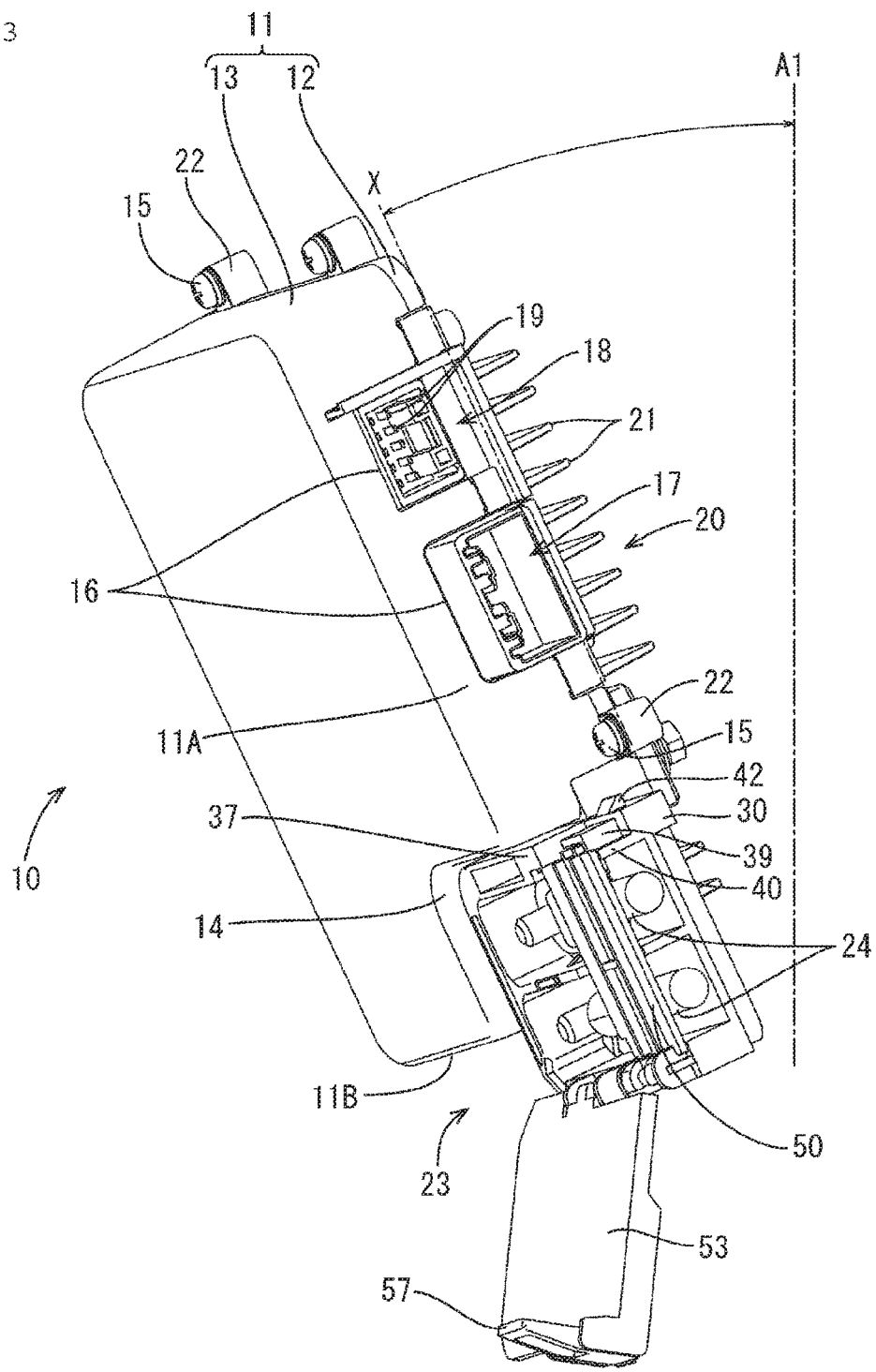
FIG. 3 is a perspective view illustrating the electrical junction box in an orientation in which it is fixed to a vehicle.
Figure 4:
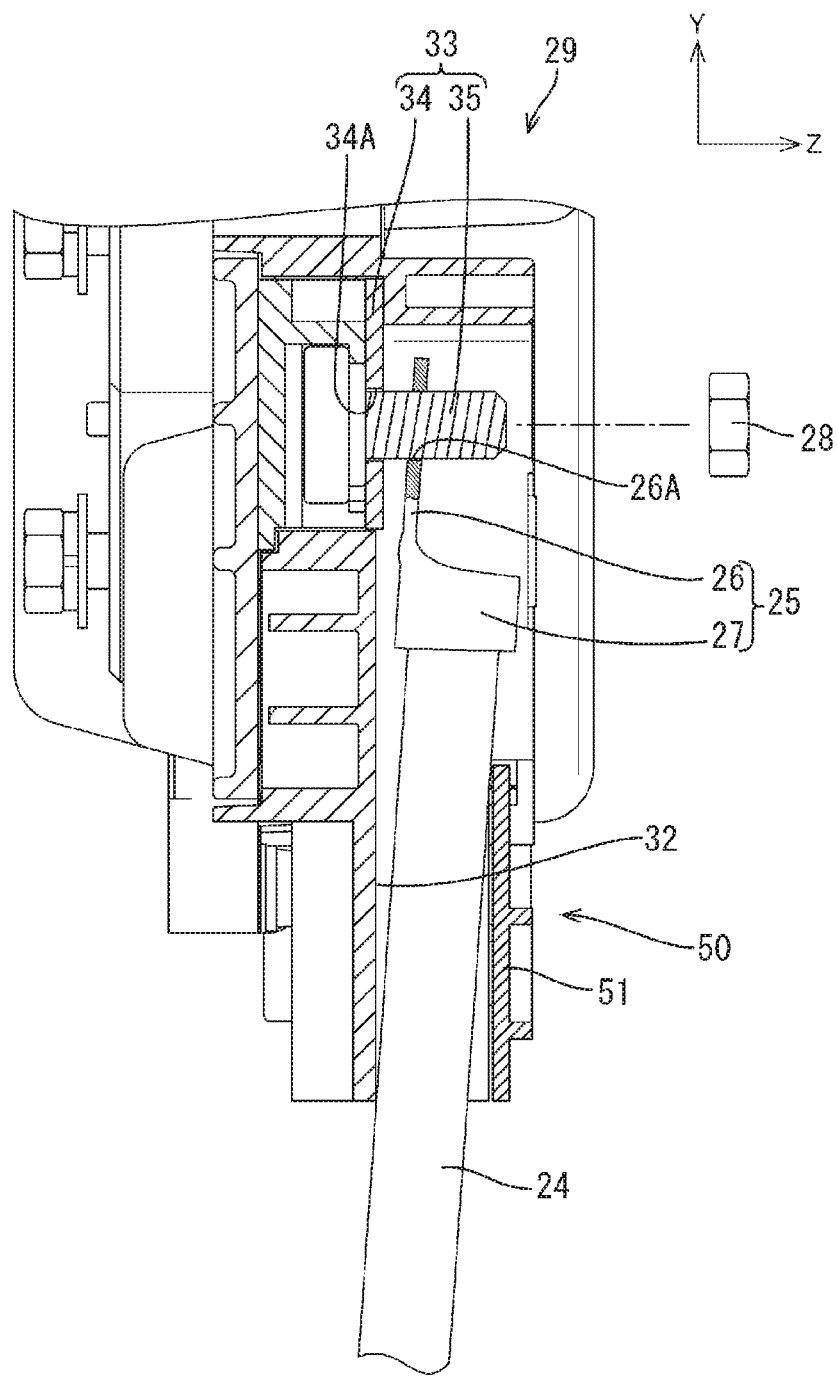
FIG. 4 is a longitudinal cross-sectional view illustrating a state in which, in the orientation of FIG. 3, terminal sections of electric wires are engaged with the electric-wire holding cover.
Figure 5:
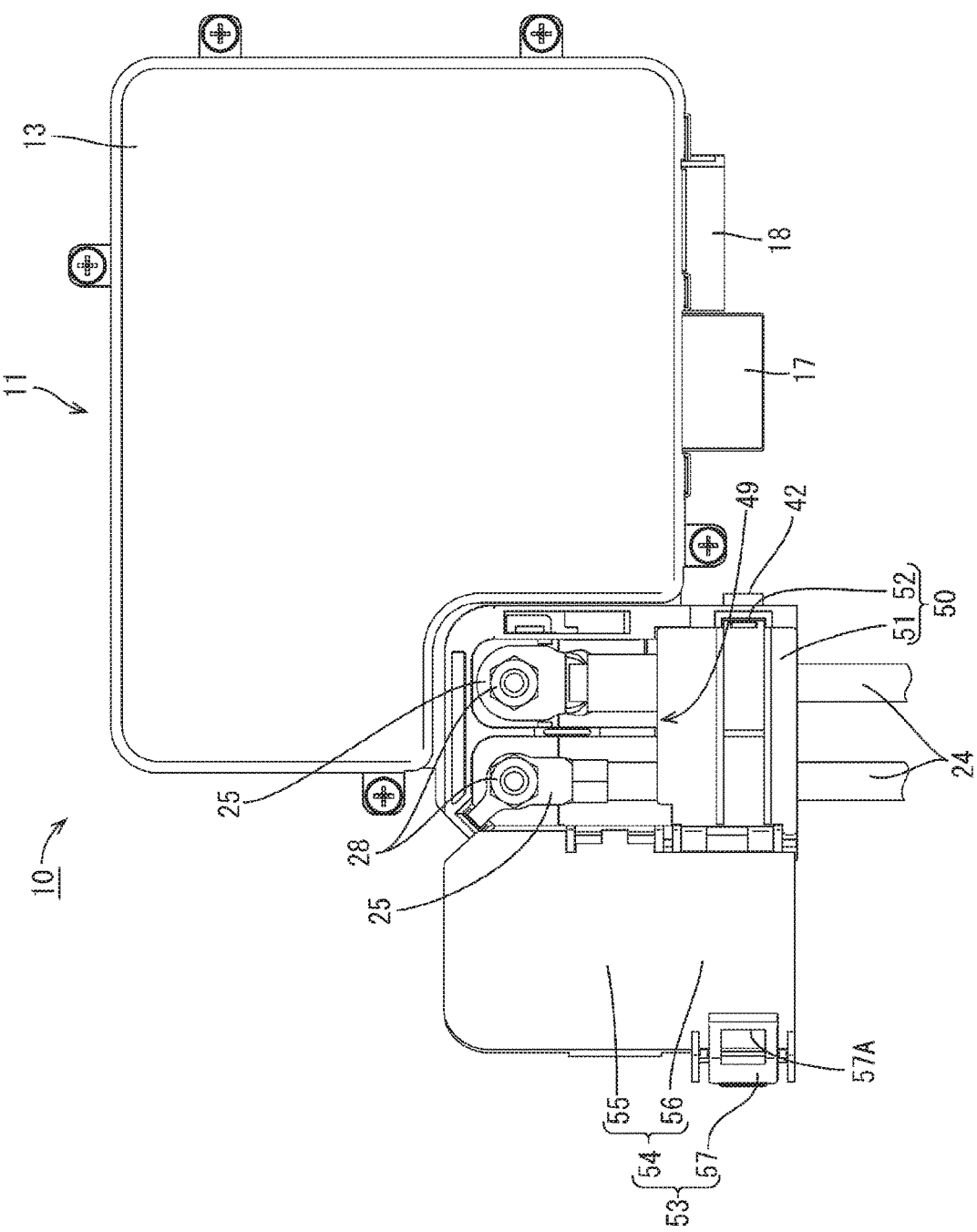
FIG. 5 is a plan view illustrating the electrical junction box in a state in which the terminal sections of the electric wires in the state of FIG. 2 are fastened to connection sections with nuts.

As shown in FIGS. 1 and 3, the electrical junction box 10 is provided with a main body casing 11 in which a circuit is accommodated, and an electric-wire mounting section 23 that is arranged on the outer side of the main body casing 11, and to which terminal sections of electric wires 24 are mounted.

Main Body Casing 11

The main body casing 11 accommodates, in the inside thereof, a not-shown circuit board on which electronic components such as switching elements, for example, FETs (Field Effect Transistors), and capacitors are mounted. The circuit board is configured by a busbar made of a metal plate material, and a printed board overlapping each other, the printed board including an insulating plate on which an electrically-conductive path made of a copper foil or the like is formed using printed wiring.

The main body casing 11 is provided with a frame section 12 that is made of a synthetic resin and is placed on the upper surface of a heat discharging member 20, and a shield cover 13 that is made of metal, and is mounted on the frame section 12. The frame section 12 is arranged between the shield cover 13 and the heat discharging member 20, and is frame-shaped extending along the lower end section of the shield cover 13 and the outer periphery of the heat discharging member 20. The frame section 12 is integrally coupled to the electric-wire mounting section 23.

The shield cover 13 is formed by subjecting plate-shaped thin-walled metal such as iron to a punching process and a bending process, and has the shape of a box whose lower side on which the frame section 12 is mounted is open. On the corner, on the electric-wire mounting section 23 side, of the shield cover 13, the shield cover 13 is provided, on its outer periphery, a recess section 14 that is formed by depressing the outer periphery at the corner, and forms a space in which the electric-wire mounting section 23 is arranged. The recess section 14 faces a partition wall 37 of the electric-wire mounting section 23 across a small gap. As a result of the lower end section of the shield cover 13 being screwed to boss sections 22 of the heat discharging member 20 with screws 15, the shield cover 13 is connected to a ground via the heat discharging member 20.

A side surface of the shield cover 13 is cut out to provide connector mounting recess sections 16 in which connector housings 17 and 18 that are to be fitted to external connectors are arranged. In the connector housings 17 and 18, connector terminals 19 that are connected to the circuit in the main body casing 11 protrude. The heat discharging member 20 for discharging heat of the circuit is mounted to the bottom-side opening of the main body casing 11. The heat discharging member 20 is made of a highly heat-conductive metal material such as an aluminum alloy or a copper alloy, and has a flat upper surface, and a bottom surface on which multiple heat discharging fins 21 are aligned.

Electric-Wire Mounting Section 23

The electric-wire mounting section 23 is provided with an accommodation section 29 that can be opened so as to allow accommodation of terminal sections of two electric wires 24, and two (multiple) covers 50 and 53 that can be opened and closed, and is configured to cover the accommodation section 29.

The electric wires 24 are coated wires that include an insulating layer formed around a conductor section, and are connected, on the side extended to the rear, to an external power supply that is not shown. The electric wires 24 are terminal electric wires that each have a front end section to which a power supply-side terminal 25 is connected. The power supply-side terminals 25 are each provided with a plate-shaped fastened section 26 that is fastened by a nut 28 serving as a fastening member, and an electric-wire connection section 27 that is contiguous to the rear of the fastened section 26, and to which the electric wire 24 is connected. The fastened section 26 has a circular through hole 26A that penetrates the fastened section 26. The conductor section exposed from the insulating coating of the coated wire 24 is crimped by and pressed against the electric-wire connection section 27.

Accommodation Section 29

The accommodation section 29 is made of an insulating synthetic resin, and has a shape that corresponds to the recess section 14 of the main body casing 11. Because the area (area in the X-Y plane) of this accommodation section 29 is larger than the area (area in the X-Y plane) of the recess section 14, the accommodation section 29 is provided with a protruding section 30 that protrudes leftward from a left side surface 11B of the main body casing 11, and protrudes rearward from a rear surface 11A of the main body casing 11 in a direction in which the electric wires 24 extend.

Figure 6:
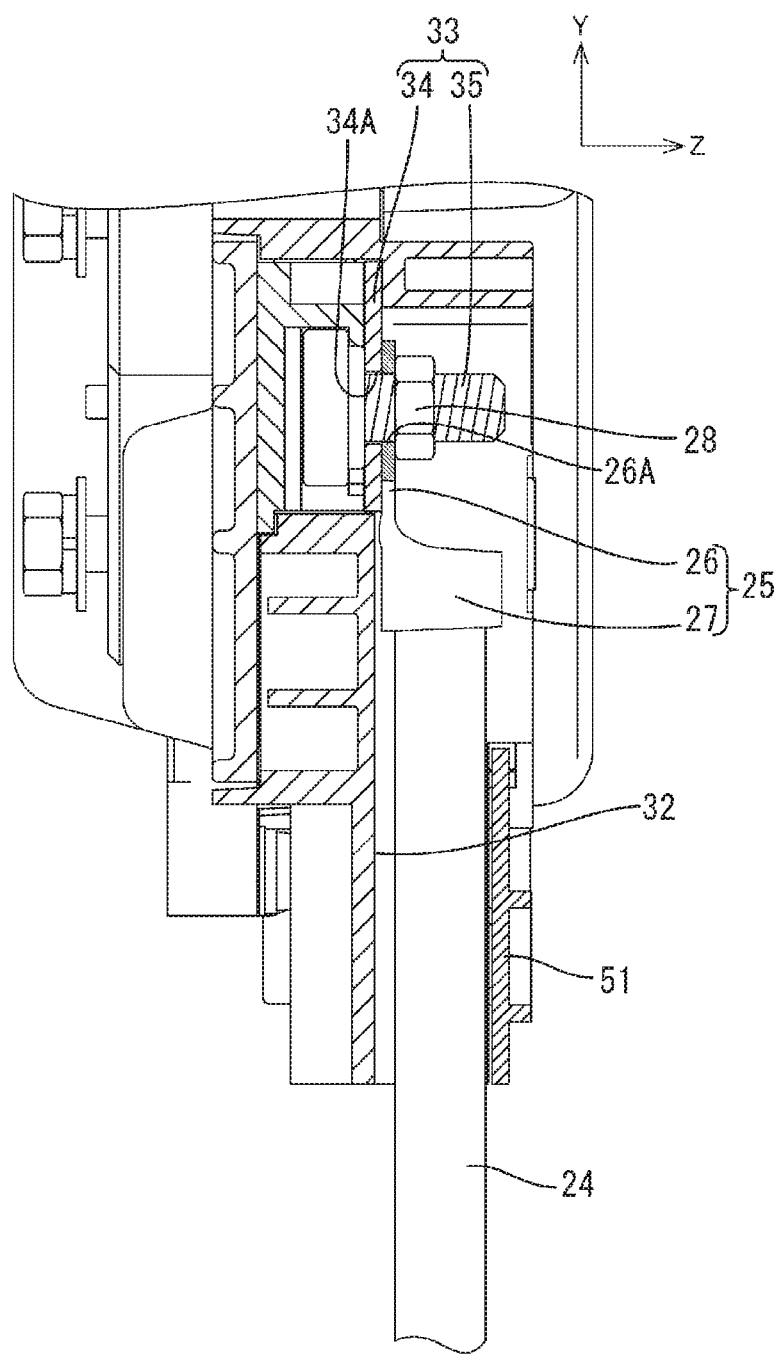
FIG. 6 is a longitudinal cross-sectional view illustrating a state in which the terminal sections of the electric wires in the state of FIG. 4 are fastened to the connection sections with the nuts.

The accommodation section 29 is provided with a placement section 32 on which terminal sections of a pair of electric wires 24 are placed, the partition wall 37 that rises from the outer peripheral edge of the placement section 32, and a separation wall 47 that separate the pair of electric wires 24 from each other. As shown in FIG. 6, connection sections 33 that are made of metal and to which the power supply-side terminals 25 are electrically connected are fixed to the placement section 32.

Each connection section 33 includes a busbar 34 that is connected to the internal circuit, and a stud bolt 35. The busbar 34 is made of plate-shaped metal, and has a through hole 34A that penetrates the busbar 34, and into which the shaft of the stud bolt 35 is inserted. The head portion of the stud bolt 35 is fixed to the busbar 34, for example, by welding in a state in which the shaft is inserted into the through hole 34A. The upper surface of the placement section 32 is flat, and extends in the direction in which the electric wires 24 extend.

As shown in FIG. 3, the partition wall 37 has a height that is slightly smaller than the height of the main body casing 11, and is U-shaped as a whole such that the partition wall 37 is not present on that side of the outer peripheral edge of the accommodation section 29 from which the electric wires 24 extend. The portion of the partition wall 37 that extends along the recess section 14 of the main body casing 11 is arranged facing the recess section 14 with a small gap between this portion and the recess section 14.

Figure 8:
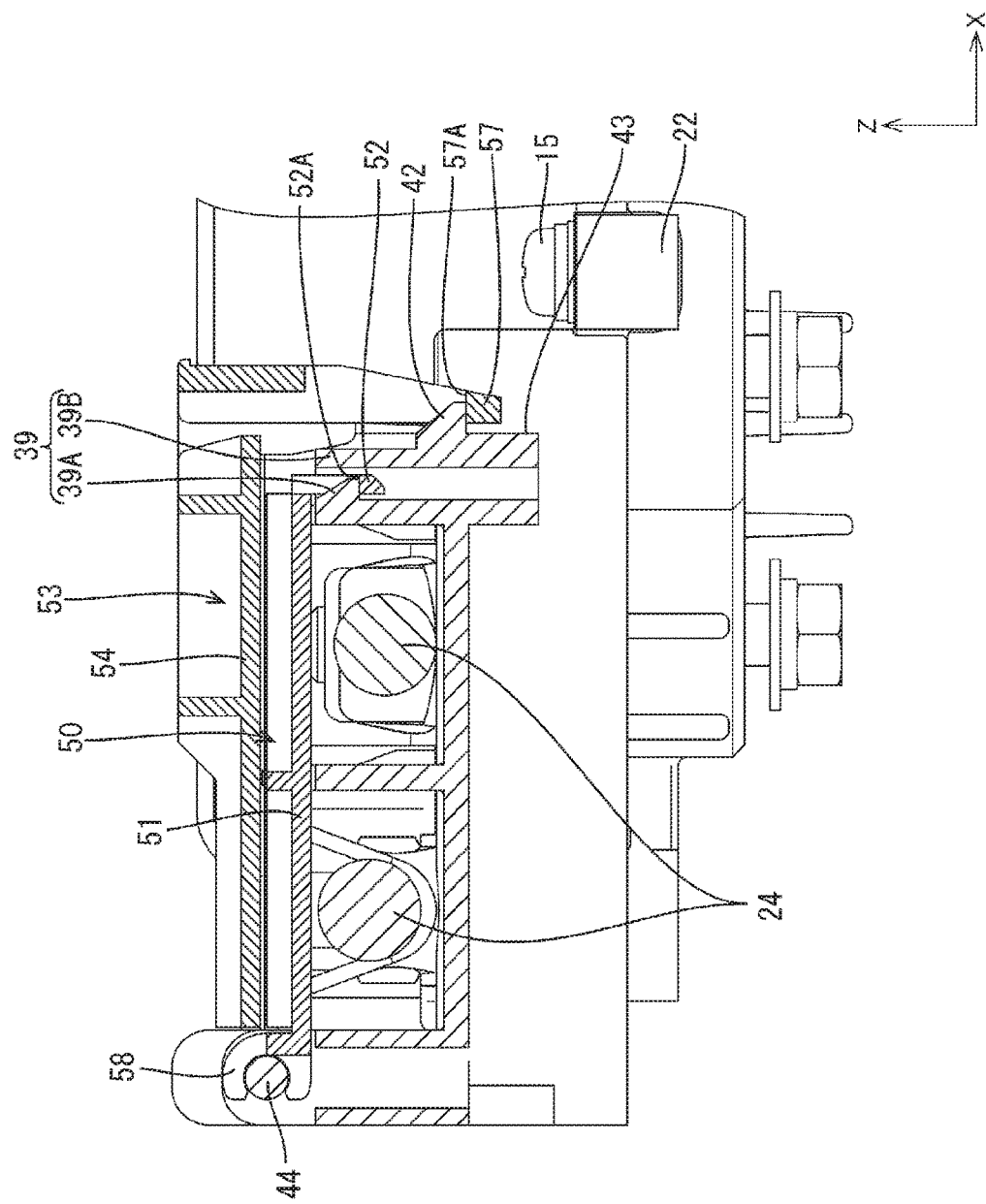
FIG. 8 is a cross section view taken along a line A-A of FIG. 7.

The partition wall 37 has, on the outer surface of the portion of the protruding section 30 that protrudes to the rear of the main body casing 11, a holding-cover engaging section 39 (described later) that engages the electric-wire holding cover 50, and a main-cover engaging section 42 that engages the main cover 53. The holding-cover engaging section 39 is formed on the outer surface of a thin-walled section 40 whose wall-thickness is reduced by cutting the outer surface side of the partition wall 37, and includes an engaging projection section 39A and a frame-shaped frame section 39B as shown in FIGS. 1 and 8. The engaging projection section 39A has a shape such that the lower end thereof projects in the shape of a step, and the projection tapers toward the upper end side thereof, forming a slope. As a result of a holding-cover engaged section 52 being inserted into the inside of the frame section 39B and being engaged with the engaging projection section 39A, the frame section 39B keeps the electric-wire holding cover 50 from opening due to the holding-cover engaged section 52 deflecting and deforming. The main-cover engaging section 42 is formed on the outer surface of a thick-walled section 43 that is thicker than the thin-walled section 40, and has a shape such that the lower end thereof projects in the shape of a step, and the projection is reduced in size toward the upper end side while forming a slope.

At the upper end in the left end section of the partition wall 37 (the end section that faces away from the main body casing 11), cover connecting sections 44 and 45 on which the electric-wire holding cover 50 and the main cover 53 are respectively mounted so as to be rotatable are formed.

The cover connecting sections 44 and 45 are elongated cylinder-shaped (rod-shaped), and are arranged coaxially at the upper end of the partition wall 37. The cover connecting section 44 is arranged on the rear end side of the partition wall 37, and the electric-wire holding cover 50 is connected thereto. The cover connecting section 45 is arranged forward the cover connecting section 44 while being aligned therewith, and the main cover 53 is connected to thereto. The cover connecting sections 44 and 45 enable the covers 50 and 53 to rotate as a result of reception sections 58 of the covers 50 and 53 being fitted to the cover connecting sections 44 and 45, and for this purpose, the cover connecting sections 44 and 45 and the reception sections 58 form hinges. The separation wall 47 has the same height as the partition wall 37, and is thinner than the partition wall 37.

The covers 50 and 53 are both formed separately from the accommodation section 29, and include the electric-wire holding cover 50 for keeping the electric wires 24 from being dislodged from the accommodation section 29, and the main cover 53 that covers an area that is larger than the electric-wire holding cover 50, and overlaps the electric-wire holding cover 50.

Electric-Wire Holding Cover 50

Figure 2:
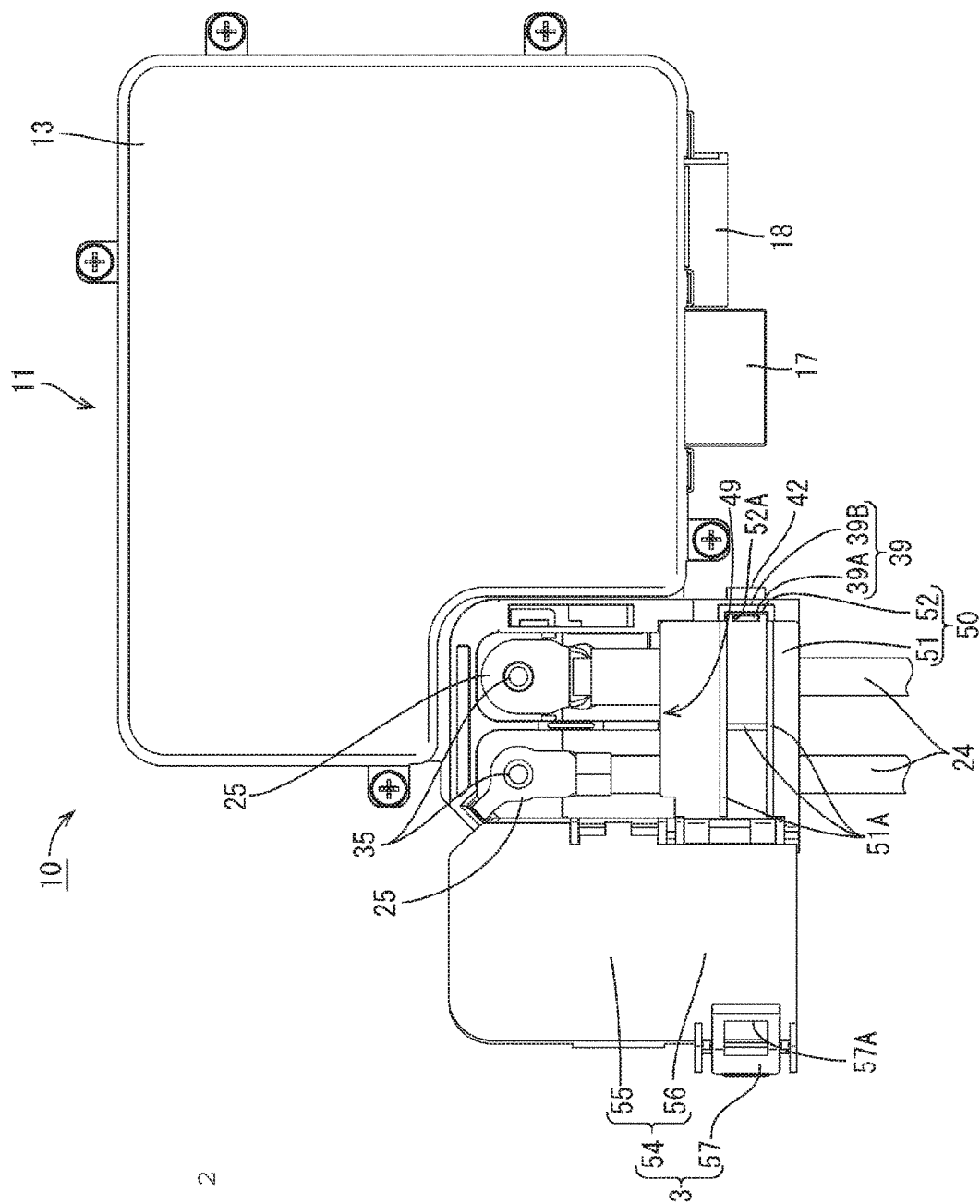
FIG. 2 is a plan view illustrating the electrical junction box with a main cover open and an electric-wire holding cover closed.

The electric-wire holding cover 50 covers the rear end side of the accommodation section 29, and is provided with: a plate-shaped section 51 that is elongated and plate-shaped; and the frame-shaped holding-cover engaged section 52 that is contiguous to an edge section of the plate-shaped section 51, and is engaged with the holding-cover engaging section 39. As shown in FIG. 2, the electric-wire holding cover 50 forms, while being closed, an opening area 49 through which an operation for mounting the terminal sections of the electric wires 24 can be performed, the opening area 49 being provided forward of the electric-wire holding cover 50. On the upper surface of the plate-shaped section 51, projections 51A extend in the front-rear direction and the left-right direction. The main cover 53 is placed onto the plate-shaped section 51 via the projections 51A. The U-shaped reception section 58 that is rotatably fitted to the cover connecting section 44 is formed on the cover connecting section 44 side of the plate-shaped section 51.

As shown in FIGS. 1 and 2, the holding-cover engaged section 52 has such a thickness that it can be deflected and deformed, and extends in a U shape at the front end section of the electric-wire holding cover 50 in a direction that is orthogonal to the plate surface of the plate-shaped section 51. The holding-cover engaged section 52 is maintained in the closed state as a result of a hole edge of an engagement hole 52A that penetrates the holding-cover engaged section 52 engaging with the holding-cover engaging section 39.

Main Cover 53

Figure 7:
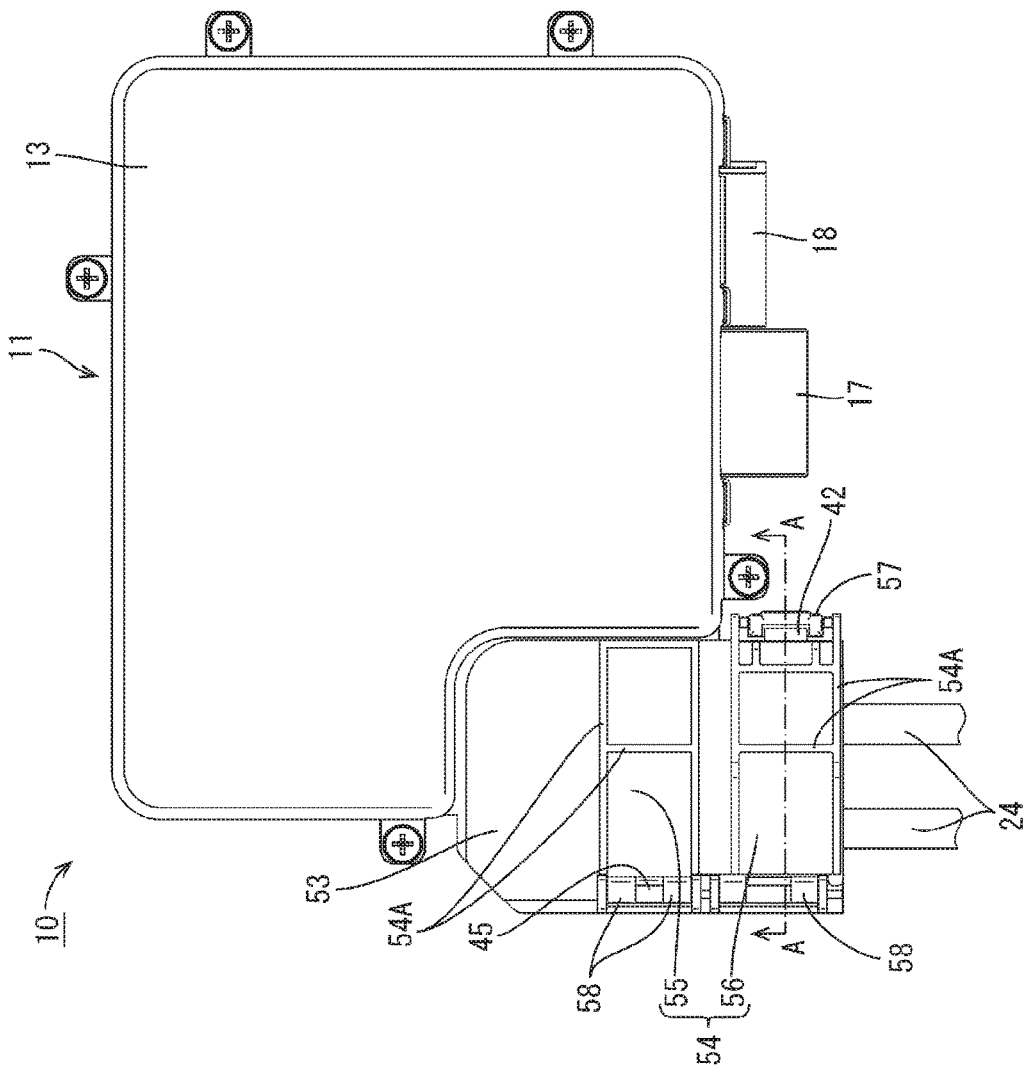
FIG. 7 is a plan view illustrating the electrical junction box with the multiple covers closed.

As shown in FIGS. 2 and 7, the main cover 53 is provided with a plate-shaped section 54 that is so large that it covers the entire accommodation section 29, and a main-cover engaged section 57 that is engaged with the main-cover engaging section 42 of the accommodation section 29.

The plate-shaped section 54 is rectangular, and is provided with an opening-area covering section 55 that covers the rectangular opening area 49 on the front side, and an extended section 56 that extends rearward from the opening-area covering section 55, and overlaps (is placed over) the plate-shaped section 51 of the electric-wire holding cover 50. On the upper surface of the plate-shaped section 54, projections 54A extend in the front-rear direction and the left-right direction. The U-shaped reception section 58 that is rotatably fitted to the cover connecting section 45 is formed on the cover connecting section 45 side of the plate-shaped section 54.

The main-cover engaged section 57 is deflectable and deformable, and extends in a U shape at the edge section of the main cover 53 in a direction that is orthogonal to the plate surface of the plate-shaped section 54. The main-cover engaged section 57 is maintained in the closed state, as a result of the main-cover engaged section 57 deflecting and deforming and a hole edge of an engagement hole 57A that penetrates the main-cover engaged section 57 engaging with the main-cover engaging section 42.

The following will describe an operation for mounting the terminal sections of the electric wires 24 to the electric-wire mounting section 23.

The electrical junction box 10 is mounted to the body of the vehicle via a not-shown bracket or the like. In this state, the electrical junction box 10 has an orientation such that it is inclined at, for example, 25 degrees relative to an axis A1 that is perpendicular to the ground (see FIG. 3).

Then, the main engagement cover 50, and the electric-wire holding cover 50 are opened (FIG. 1), and the shafts of the pair of stud bolts 35 protruding perpendicularly from the bottom of the accommodation section 29 are passed through the through holes 26A of the pair of power supply-side terminals 25. Since, in this state, the terminal sections of the electric wires 24 tend to be dislodged due to the orientation of the electrical junction box 10, an operator closes the electric-wire holding cover 50. The holding-cover engaged section 52 is engaged with the holding-cover engaging section 39, and the electric-wire holding cover 50 is kept from opening (FIG. 3). Accordingly, the electric wires 24 are engaged with the electric-wire holding cover 50 (FIG. 4), and the terminal sections of the electric wires 24 are kept from being dislodged from the accommodation section 29.

When the power supply-side terminals 25 are fastened to the stud bolts 35 with the nuts 28, the electric wires 24 are separated from the electric-wire holding cover 50, the surfaces of the fastened sections 26 of the power supply-side terminals 25 are overlapped with (placed on) the surface of the busbar 34, and the power supply-side terminals 25 are fixed to the connection sections 33 (FIG. 6).

Then, by closing the main cover 53, the main-cover engaged section 57 is engaged with the main-cover engaging section 42, and the main cover 53 is maintained in the closed state (FIG. 7).

Functions and effects of the present embodiment will be described below.

According to the present embodiment, an operation for mounting the terminal sections of the electric wires 24 can be performed through the opening area 49 in a state in which the electric-wire holding cover 50 is engaged with the electric wires 24, keeping the electric wires 24 from being dislodged from the accommodation section 29, thus making it possible to improve the operability of mounting the terminal sections of the electric wires 24.

Here, a configuration in which the electric-wire holding cover 50 can be opened and closed using the side that faces away from the main body casing 11 as an axis has the advantage that when the electrical junction box 10 is arranged in an orientation in which this axis is on the lower end side, the operator does not need to keep the electric-wire holding cover 50 open by him- or herself in the operation for mounting the terminal sections of the electric wires 24, in contrast to an orientation in which the axis is on the upper end side. But, in order to keep the main cover 53 closed, it is necessary to provide, on the main body casing 11 side, a space in which the main-cover engaged section 57 is engaged. Providing such a space in which the main-cover engaged section 57 is engaged on the main body casing 11 side may cause the problem that the demand for downsizing the electrical junction box 10 is not met. According to the present embodiment, because the main-cover engaged section 57 of the main cover 53 extends to the electric-wire holding cover 50 side, and is engaged with the accommodation section 29 on the electric-wire holding cover 50 side, it is possible to engage the main cover 53 in the closed state without necessarily providing a large space in which the main-cover engaged section 57 is engaged between the main body casing 11 and the electric-wire mounting section 23. Accordingly, it is possible to improve operability of mounting the terminal sections of the electric wires 24 while downsizing the electrical junction box 10.

Furthermore, the accommodation section 29 includes the protruding section 30 that protrudes outward from the outer peripheral surface of the main body casing 11, and the accommodation section 29 is provided with the holding-cover engaging section 39 that engages the electric-wire holding cover 50 in the closed state, and the main-cover engaging section 42 by which the main-cover engaged section 57 is engaged, the holding-cover engaging section 39 and the main-cover engaging section 42 being both arranged in the protruding section 30.

With this, it is possible to use the configuration of the protruding section 30 that protrudes outward from the outer peripheral surface of the main body casing 11 so as to engage the main cover 53 with the accommodation section 29, making it possible to put a dead space to effective use.

Moreover, the holding-cover engaging section 39 and the main-cover engaging section 42 are aligned.

With this measure, it is possible to arrange the holding-cover engaging section 39 and the main-cover engaging section 42 together, and thus a configuration for engaging the covers 50 and 53 with the accommodation section 29 can be simplified.

Furthermore, the main-cover engaged section 57 is engaged with the main-cover engaging section 42 via the outer side of the holding-cover engaging section 39.

With this measure, a space that is needed for engaging the covers 50 and 53 with the accommodation section 29 can be reduced, and thus it is possible to downsize the electrical junction box 10.

Moreover, the electric-wire holding cover 50 and the main cover 53 are connected to the accommodation section 29 via the hinges (cover connecting sections 44 and 45, and the reception sections 58), and thus it is possible to improve operability when opening and closing the electric-wire holding cover 50 and the main cover 53.

Furthermore, since the main cover 53 is overlapped with the electric-wire holding cover 50, it is possible to simplify the configuration of the covers 50 and 53.

Furthermore, the electrical junction box 10 is fixed to the vehicle in an orientation such that the terminal sections of the electric wires 24 that are accommodated in the accommodation section 29 and are not connected to the connection sections 33 are biased in the direction in which they are dislodged from the accommodation section 29 due to the force of gravity, and thus it is possible to improve operability when an operation for mounting the terminal sections of the electric wires 24 to the electrical junction box 10 of the vehicle is performed.

Other Embodiments

The present invention is not limited to the embodiment that has been described with reference to the description above and the drawings, and the technical scope of the present invention encompasses, for example, the following embodiments:

(1) The main cover 53 is formed so as to have such a size that it overlaps the entirety of the electric-wire holding cover 50, but the present invention is not limited to this. For example, it is also possible that the area of the extended section 56 is reduced so as to overlap a part of the electric-wire holding cover 50, or the main cover 53 does not overlap the electric-wire holding cover 50.

(2) The electrical junction box 10 is not limited to one that is arranged in the above-described orientation, and may be arranged in various orientations.

(3) The position at which the main-cover engaged section 57 is engaged is not limited to the position on the side surface, on the main body casing 11 side, of the protruding section 30. For example, the main-cover engaged section 57 may be engaged on the rear surface (on the side on which the electric wire extends) of the protruding section 30.

The invention claimed is:
1. An electrical junction box comprising:
a main body casing in which a circuit is accommodated; and an electric-wire mounting section to which a terminal section of an electric wire is mounted;

wherein the electric-wire mounting section includes: an accommodation section that can be opened so as to allow accommodation of the terminal section of the electric wire, and in which a connection section to which the terminal section of the electric wire is electrically connected is arranged; an electric-wire holding cover that can be opened and closed, and is configured to cover the accommodation section; and a main cover that can be opened and closed, while being closed, the electric-wire holding cover engages the electric wire that has not yet been connected to the connection section, keeping the electric wire from being dislodged from the accommodation section, and forms an opening area through which an operation for connecting the terminal section of the electric wire to the connection section can be performed, and the main cover is configured to cover the opening area and the electric-wire holding cover when the main cover is closed.

2. The electrical junction box according to claim 1, wherein the main cover is provided with: an opening-area covering section for covering the opening area; and a main-cover engaged section that extends from the opening-area covering section toward the electric-wire holding cover, and is engaged with the accommodation section on the electric-wire holding cover side in a state in which the main cover is closed.

3. The electrical junction box according to claim 2, wherein the accommodation section is provided with a holding-cover engaging section that engages the electric-wire holding cover when the electric-wire holding cover is in a closed state; and a main-cover engaging section by which the main-cover engaged section is engaged, the holding-cover engaging section and the main-cover engaging section being aligned.

4. The electrical junction box according to claim 1, wherein at least one of the electric-wire holding cover and the main cover is connected to the accommodation section via a hinge.

5. The electrical junction box according to claim 1, wherein the main cover is configured to overlap the electric-wire holding cover.

6. The electrical junction box according to claim 1, wherein the electrical junction box is fixed to a vehicle in an orientation such that the terminal section of the electric wire is biased in a direction in which it is dislodged from the accommodation section.

7. The electrical junction box according to claim 2, wherein at least one of the electric-wire holding cover and the main cover is connected to the accommodation section via a hinge.

8. The electrical junction box according to claim 3, wherein at least one of the electric-wire holding cover and the main cover is connected to the accommodation section via a hinge.

9. The electrical junction box according to claim 2, wherein the main cover is configured to overlap the electric-wire holding cover.

10. The electrical junction box according claim 3, wherein the main cover is configured to overlap the electric-wire holding cover.

11. The electrical junction box according to claim 4, wherein the main cover is configured to overlap the electric-wire holding cover.

12. The electrical junction box according to claim 2, wherein the electrical junction box is fixed to a vehicle in an orientation such that the terminal section of the electric wire is biased in a direction in which it is dislodged from the accommodation section.

13. The electrical junction box according to claim 3, wherein the electrical junction box is fixed to a vehicle in an orientation such that the terminal section of the electric wire is biased in a direction in which it is dislodged from the accommodation section.

14. The electrical junction box according to claim 4, wherein the electrical junction box is fixed to a vehicle in an orientation such that the terminal section of the electric wire is biased in a direction in which it is dislodged from the accommodation section.

15. The electrical junction box according to claim 5, wherein the electrical junction box is fixed to a vehicle in an orientation such that the terminal section of the electric wire is biased in a direction in which it is dislodged from the accommodation section.

\* \* \* \* \*